(12) United States Patent
Hanna et al.

(10) Patent No.: US 6,574,523 B1
(45) Date of Patent: Jun. 3, 2003

(54) SELECTIVE CONTROL OF MECHANICAL PROPERTIES IN STEREOLITHOGRAPHIC BUILD STYLE CONFIGURATION

(75) Inventors: Stephen D. Hanna, Los Angeles, CA (US); Khalil M. Moussa, Stevenson Ranch, CA (US)

(73) Assignee: 3D Systems, Inc., Valencia, CA (US)

( * ) Notice: Subject to any disclaimer, the term of this patent is extended or adjusted under 35 U.S.C. 154(b) by 0 days.

(21) Appl. No.: 09/566,046

(22) Filed: May 5, 2000

(51) Int. Cl.[7] .................................................. G06F 19/00
(52) U.S. Cl. ...................................... 700/120; 345/420
(58) Field of Search .............................. 700/120, 98, 118, 700/119; 345/419, 420, 421, 422, 441; 264/401

(56) References Cited

U.S. PATENT DOCUMENTS

| | | | |
|---|---|---|---|
| 4,575,330 A | 3/1986 | Hull .................. 425/174.4 |
| 5,058,988 A | 10/1991 | Spence ................. 356/121 |
| 5,174,931 A | 12/1992 | Almquist et al. ........... 345/419 |
| 5,182,056 A | 1/1993 | Spence et al. ............. 345/418 |
| 5,198,159 A | 3/1993 | Nakamura et al. .......... 264/401 |
| 5,236,812 A | 8/1993 | Vassiliou et al. ........... 430/327 |
| 5,238,639 A | * 8/1993 | Vinson et al. .............. 264/401 |
| 5,263,130 A | 11/1993 | Pomerantz et al. ......... 264/401 |
| 5,386,500 A | 1/1995 | Pomerantz et al. ......... 264/401 |
| 5,474,719 A | 12/1995 | Fan et al. ................. 264/401 |
| 5,536,467 A | * 7/1996 | Reichle et al. ............. 264/401 |
| 5,597,520 A | * 1/1997 | Smalley et al. ............ 264/401 |
| 5,626,919 A | 5/1997 | Chapman et al. ........... 427/510 |
| 5,897,825 A | 4/1999 | Fruth et al. ................ 264/401 |
| 5,922,364 A | 7/1999 | Young, Jr. ............... 425/174.4 |
| 5,985,204 A | 11/1999 | Otsuka et al. ............. 264/497 |
| 6,100,007 A | * 8/2000 | Pang et al. ................ 430/269 |
| 6,136,497 A | * 10/2000 | Melisaris et al. ........... 430/269 |
| 6,391,251 B1 | * 5/2002 | Keicher et al. ............... 419/7 |
| 6,406,658 B1 | * 6/2002 | Manners et al. ........... 264/401 |

FOREIGN PATENT DOCUMENTS

| | | |
|---|---|---|
| EP | 0 470 705 A2 | 2/1992 |
| JP | 02095830 | 4/1990 |
| JP | 10119136 | 5/1998 |
| WO | 92/08200 | 5/1992 |

OTHER PUBLICATIONS

U.S. patent application Ser. No. 09/493,938, filed Jan. 28, 2000 by Kulkarni.

* cited by examiner

Primary Examiner—Leo Picard
Assistant Examiner—Zoila Cabrera
(74) Attorney, Agent, or Firm—Ralph D'Alessandro; Michael A. Ervin

(57) ABSTRACT

An improved process for forming photocurable three-dimensional objects using an improved curing process is disclosed. The build object is formed by using differential curing of the photocurable media material to form cured solid regions with discrete mechanical properties at selected locations to tailor a part's properties to individual needs.

25 Claims, 4 Drawing Sheets

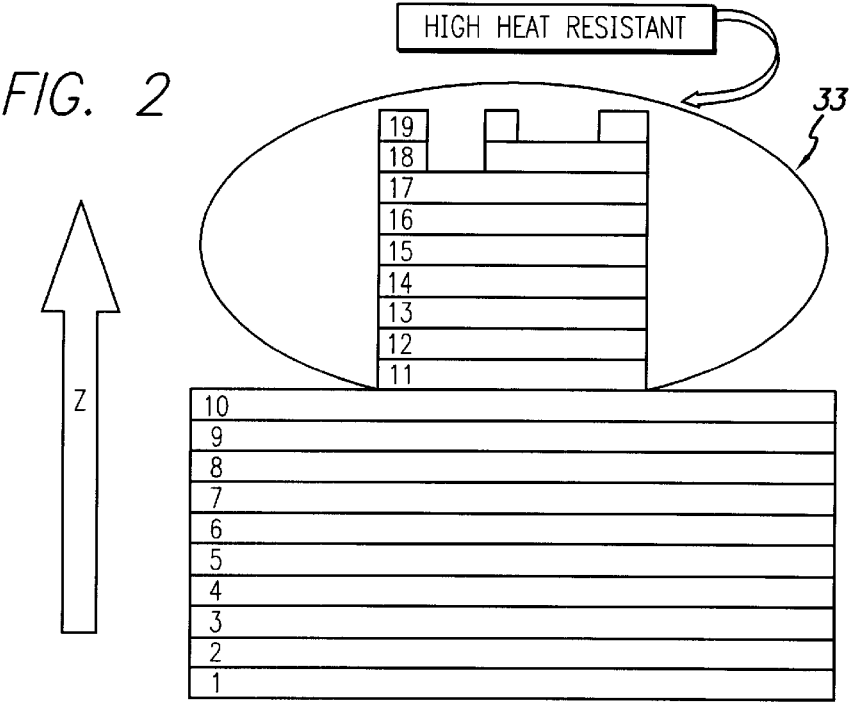
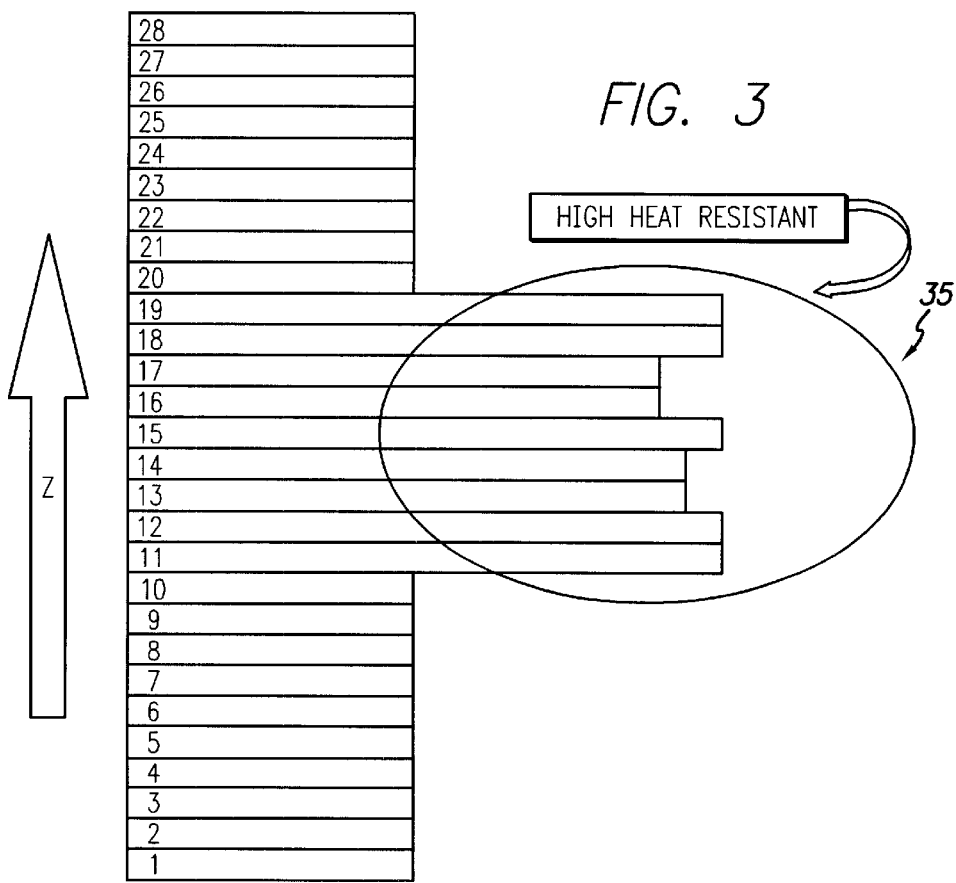

SELECTIVE CONTROL OF MECHANICAL PROPERTIES IN STEREOLITHOGRAPHIC BUILD STYLE CONFIGURATION

FIELD OF INVENTION

The present invention is directed to methods for forming three-dimensional objects on a layer-by-layer basis and, more particularly, is directed to a method of controlling part mechanical properties for stereolithographic and other three-dimensional photocured objects by using an improved method of curing the photocurable medium or photopolymer liquid from which the three-dimensional build object is generated.

BACKGROUND OF THE INVENTION

In recent years, many different techniques for the fast production of three-dimensional models have been developed for industrial use. These are sometimes referred to as rapid prototyping and manufacturing ("RP&M") techniques. In general, rapid prototyping and manufacturing techniques build three-dimensional objects layer by layer from a working medium utilizing a sliced data set representing cross-sections of the object to be formed. Typically, an object representation is initially provided by a Computer Aided Design (CAD) system.

Stereolithography, presently the most common RP&M technique, may be defined as a technique for the automated fabrication of three-dimensional objects from a fluid-like material utilizing selective exposure of layers of the material at a working surface to solidify and adhere successive layers of the object (i.e. laminae). In stereolithography, data representing the three-dimensional object is input as, or converted into, two-dimensional layer data representing cross-sections of the object. Layers of material are successively formed and selectively transformed or solidified (i.e. cured) using a computer controlled laser beam of ultraviolet light (UV) light into successive laminae according to the two-dimensional layer data. During transformation, the successive laminae are bonded to previously formed laminae to allow integral formation of the three-dimensional object.

The basic stereolithographic approach to forming three-dimensional objects is described in U.S. Pat. No. 4,575,330, (C. W. Hull), issued on Mar. 11, 1986, and later reexamined (certificate issued on Dec. 19, 1989). This patent describes a system for generating three-dimensional objects by creating a cross-sectional pattern as described above.

Stereolithography represents an unprecedented way to quickly make complex or simple parts without tooling. Since this technology depends on using a computer to generate its cross-sectional patterns, there is a natural data link to CAD/CAM. However, such systems have encountered difficulties relating to shrinkage, curl and other distortions, as well as resolution, accuracy, and difficulties in producing certain object shapes. Additionally, until the present time these systems have not been able to create build parts with different properties in different regions of the object.

Although stereolithography has shown itself to be an effective technique for forming three-dimensional objects, various improvements addressing the technology's difficulties have been desired for some time. Many improvements have addressed the aforementioned difficulties and have been made to object accuracy, speed and appearance of the build object over the years. However, there still remains a need for further improving the build object appearance and ease of making certain object shapes with different build object properties in different regions of the same part. Various aspects of the stereolithographic building process can impact the build object appearance, ease of generation, and properties of the three-dimensional object. For instance, two aspects and areas for needed improvement are the ability to control the thermal resistance and the tensile elongation or durability of a part built using stereolithography or of a region built within a part.

The problem of being able to build a stereolithographic part with different mechanical properties from a single photopolymer material has not been achievable until now. Prior approaches have produced models or parts from different photopolymer materials and glued them together. Recently, the fabrication of supports, which act like fixtures in conventional machining and hold the build object or part in place during the build process, have employed differential curing to create weak areas at the point of attachment to the build object to facilitate part removal. This differential curing exposes the supports to the laser for varying lengths of time to obtain different cure depths of the photopolymer material at different locations. The less cured areas are at the weak points. This is described in co-pending U.S. application Ser. No. 09/493,938 filed Jan. 28, 2000. These supports are removed from the green part prior to postprocessing and curing. However, there has been no ability to produce a build object or part having discrete mechanical properties in different regions from a single photopolymer material.

One form of three-dimensional object modeling that addresses the issue of producing desirable characteristics in build parts by controlling the depth of penetration of the actinic radiation into a vat of photopolymer uses a technique known as beam profiling. U.S. Pat. Nos. 5,058,988 and 5,182,056 discuss the control of the depth and width of photopolymer cured by a computer controlled laser beam. The '988 patent discloses a method and apparatus that determines the net exposure of the photopolymer by sensing the intensity of the laser beam and then calculating the cure parameter or depth based on the determined net exposure and properties of the photopolymer. The '056 patent discloses the use of two different wavelength exposure beams to cure the photopolymer to different cure depths. Neither patent teaches the creation of a stereolithographic part with discrete mechanical properties in different regions.

These problems are solved in the method of forming a three-dimensional object using the present invention.

SUMMARY OF THE INVENTION

It is an aspect of the present invention that a build object or part is created with different mechanical properties in discrete regions from a single photocurable medium by employing a method of curing the photocurable medium liquid to form the build object that employs differential curing of discrete regions of the build.

It is another aspect of the present invention that differential curing of the build object or part can be employed to create parts with tailored durability having greater tensile elongation or durability in certain areas of the part where required while preserving faster build speeds overall.

It is a feature of the present invention that varying the exposure as the part or build object is made provides different properties in the part.

It is another feature of the present invention that the stereolithographic build method and apparatus tailors the durability of the part by controlling the applied exposure, laser spot size, the laser firing or repetition rate, and the laser power.

It is yet another feature of the present invention that the stereolithographic build method and apparatus to control the exposure of the photocurable medium while creating the part or build object by employing wider hatch spacing, use of different laser repetition firing rates and use of different laser spot sizes.

It is an advantage of the present invention that a build object or part is obtained which has graded mechanical properties.

It is another advantage of the present invention that more delicate build objects or parts may be obtained.

It is yet another advantage of the present invention that the heat deflection temperature under load (HDT) can be selectively increased in selected part regions, as required.

It is still another advantage of the present invention that the entire part or build object is not softened in the green or uncured postprocessed state to achieve high heat deflection resistance in one or more desired regions of the part.

These and other aspects, features, and advantages are obtained by the present invention through the use of a method of differential curing of the photocurable medium forming the part or build object as the object is formed to control the mechanical properties of discrete regions within the part.

BRIEF DESCRIPTION OF THE DRAWINGS

These and other aspects, features and advantages of the invention will become apparent upon consideration of the following detailed disclosure of the invention, especially when taken in conjunction with the following drawings wherein:

FIG. 2 is a diagrammatic illustration of a part or build object made by using the present invention to have high heat resistance in a selected vertical portion of the part;

FIG. 3 is a diagrammatic illustration of a part or build object made by using the present invention to have high heat resistance in a selected lateral portion of the part;

DETAILED DESCRIPTION OF THE PREFERRED EMBODIMENT

While the present invention is discussed primarily in the context of a stereolithographic system, it is to be understood that the principles can equally well be applied to other 3-dimensional photocuring systems. These can include layer-by-layer building systems employing solid ground curing, UV ink jet photopolymer solid object forming, or other UV curable forming methods. The stereolithographic system with which the present invention is used generates three-dimensional objects by creating cross-sectional pattern of the object to be formed at a selected surface of a fluid medium. A UV curable liquid or the like, capable of having its physical state altered in response to appropriate synergistic stimulation, such as impinging electromagnetic radiation, electron, or other particle beam bombardment is employed. For example, radiation solidifiable powders could be used. Plastic powders and sinterable metal powders are appropriate powders. Successive adjacent laminae, representing corresponding successive adjacent cross-sections of the object, are automatically formed in response to the synergistic stimulation and are integrated together to provide a step-wise laminae or thin layer buildup of the object. In this manner a three-dimensional object is formed from a substantially planar or sheet-like surface of the fluid medium during the forming process.

Figure 1:
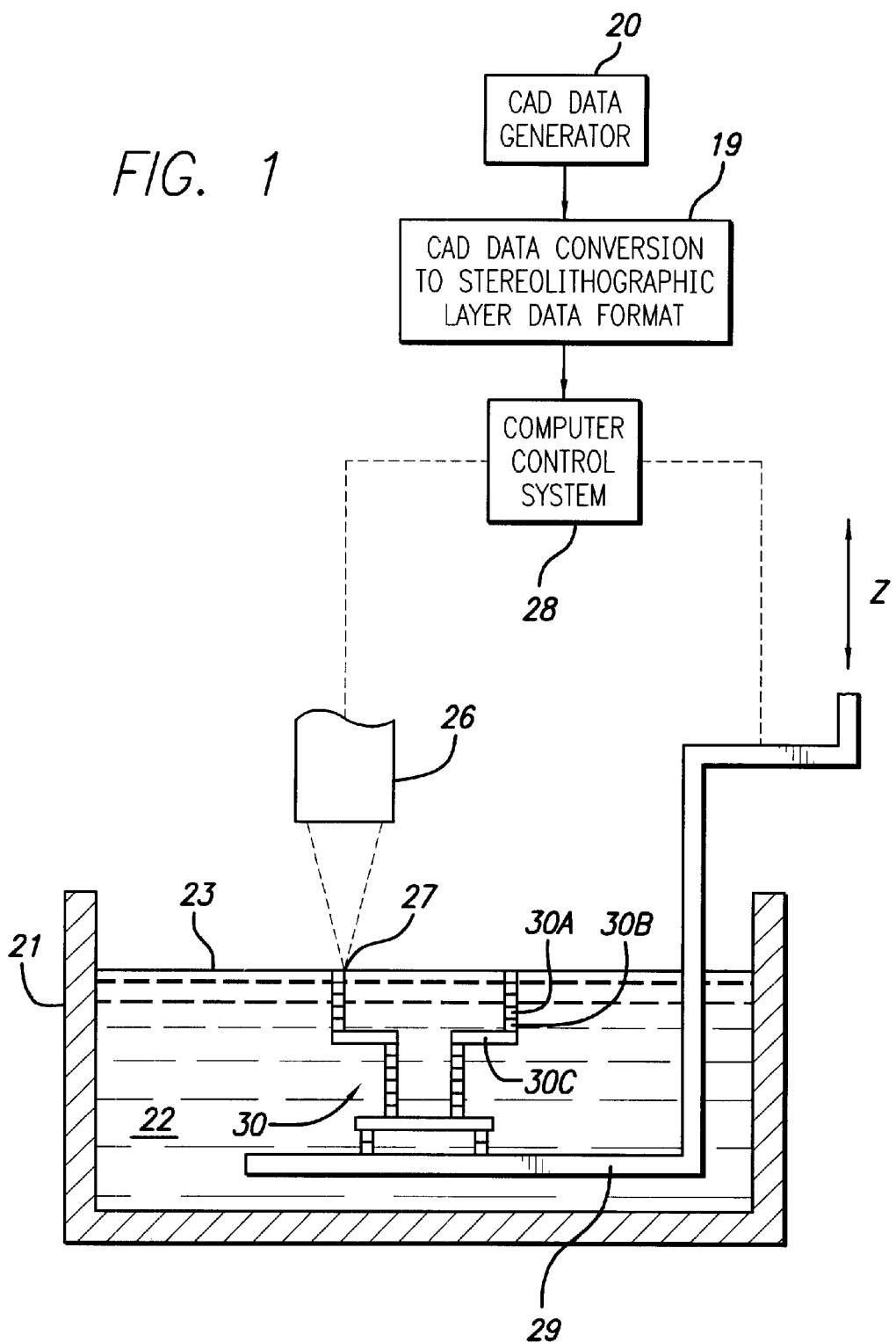
FIG. 1 is a diagrammatic illustration of a stereolithographic system.

FIG. 1 shows a preferred stereolithographic system in elevational cross-section. A container 21 is filled with a UV curable photopolymer 22 or the like, to provide a designated working surface 23. A programmable source of ultraviolet light 26 or the like produces a spot 27 of ultraviolet light on the plane of surface 23. The spot 27 is movable across the surface 23 by the motion of mirrors or other optical or mechanical elements (not shown in FIG. 1) used with the light source 26. The position of the spot 27 on surface 23 is controlled by a computer control system 28. The system 28 may be controlling the formation of cross-sections based on CAD data produced by a generator 20 in a CAD design system or the like and directed in .STL file format via network communication, such as ETHERNET or the like, to a computerized conversion system 19 where information defining the object is specially sliced and processed. The .STL file is a tessellated object description consisting of the X, Y, and Z coordinates of the three vertices of each surface polygon, as well as an index that describes the orientation of the surface normal. The surface polygons preferably are triangles. The object data is manipulated to optimize the data and provide output vectors. The manipulated data will also reduce stress, curl and distortion, and increase resolution, strength, accuracy, speed and economy of reproduction, even for rather difficult and complex object shapes in the built part. The interface computer generates layer data by slicing, varying layer thickness, rounding polygon vertices, filling, scaling, cross-hatching, offsetting vectors, ordering of vectors, and generating flat skins, near-flat skins, up-facing and down-facing skins.

A movable elevator platform 29 inside container 21 can be moved up and down selectively. The position of the platform 29 is controlled by the system 28. As the device operates, it produces a three-dimensional part 30 by step-wise buildup of integrated laminae, or layers, such as 30c, 30b, and 30a.

The surface of the UV curable liquid 22 is maintained at a constant level in the container 21. The spot 27 of UV light, or other suitable form of reactive stimulation, is of sufficient intensity to provide the exposure to cure the liquid and convert it to a solid material, as it is moved across the working surface 23 in a programmed manner. As the liquid 22 cures and solid material forms, the elevator platform 29 that was initially just below surface 23 is moved down from the surface in a programmed manner by any suitable actuator. In this way, the solid material that was initially formed is taken below surface 23 in preparation for new liquid 22 to recoat over the previously cured layers to form a new surface 23. The distance between the new surface 23 and the upper surface of the previously cured layer is equal to the layer thickness of the next layer to be formed. Alternatively a new coating of UV curable material or photopolymer may be applied by a doctor blade, as described in U.S. Pat. No. 5,174,931 and assigned to the assignee of the present invention, which is specifically incorporated by reference in pertinent part. A portion of this new liquid is, in turn, converted to solid material by the programmed UV light spot 27, and the newly solidified material adhesively connects to the material below it. This process is continued until the entire three-dimensional part 30 is formed. The part 30 is then removed from the container 21, and the apparatus is ready to produce another part. Another part can then be produced, or some new part can be made by changing the design, data, or program in the computer 28, or CAD generator 20.

The light source 26 of a stereolithography system according to a preferred embodiment of the invention is typically a solid state ultraviolet laser. Other embodiments can employ an Argon ion or a helium-cadmium ultraviolet laser, or any other UV light source.

A commercial stereolithography system will have additional components and subsystems besides those shown in connection with the schematically depicted systems of FIG. 1. For example, the commercial system would also have a frame and housing, and a control panel. It should have means to shield the operator from excess UV light, and it may also have means to allow viewing of the part 30 while it is being formed. Commercial units will provide safety means for controlling ozone and noxious fumes, as well as conventional high voltage safety protection and interlocks. Some commercial units may also have means to effectively shield the sensitive electronics from electronic noise sources. The commercialized stereolithographic unit is a self-contained system that includes a CAD system or interfaces directly with the user's CAD system. Such commercial units are available as SLA® systems from 3D Systems, Inc. of Valencia, Calif.

The vector data and parameters from the computer control system 28 are directed to a controller subsystem (not shown) for operating the system's stereolithographic laser, mirrors, elevator and the like. These permit the solid individual laminae that represent cross-sections of the build object or part to be generated and the laminae to be successfully combined to form the three-dimensional part. The part is generated by the application of an appropriate form of energy stimulation as a graphic pattern according to these vector data and parameters at the fluid medium surface to form the thin individual layers or laminae. Each solid layer or individual lamina represents an adjacent cross-section of the three-dimensional object to be produced. Successive adjacent layers or laminae are superimposed as they are formed to generate the three-dimensional object or part.

Stereolithography parts are preferably built on structures known as supports, rather than directly on the elevator platform which moves the build object or part up and down as successive layers or laminae are formed in the photocuring processing. One reason for using supports is to separate the part from the platform. Another reason for using supports is to improve liquid flow around the part. This enables use of a shorter dip or recoating time, since the surface of the liquid will settle faster with improved flow. Additionally, excess resin will drain faster from the completed part to reduce post-processing time.

Supports are also used to anchor sections of a part which would otherwise have a tendency to move and to strengthen areas susceptible to curl or damage during part generation. Support structure is required to build hollow parts or parts with unsupported overhang. Support structure is removed from the green part after build and prior to postprocessing curing.

Any suitable fluid medium capable of solidification in response to the application of an appropriate form of energy stimulation may be employed in the practice of the present invention. Many liquid state chemicals are known which can be induced to change to solid state polymer plastic by irradiation with ultraviolet light or exposure to other forms of stimulation, such as electron beams, visible or invisible light, or reactive chemicals applied by ink jet or via a suitable mask. Suitable photopolymers that may be employed in the practice of the present invention include any commercially available photopolymer manufactured by Ciba Specialty Chemicals, Inc. of Los Angeles, Calif., and sold by 3D Systems, Inc. of Valencia, Calif. These include, but are not limited to, SL 7540, SL 5170, SL 5180, SL 5195, SL 5530 and SL 5510 for use in any 3D Systems' commercially available SLA® system.

The present invention can be practiced on any stereolithographic equipment, but shall be discussed in the context of being utilized in SLA® 3500, 5000 and 7000 systems available conmmercially from 3D Systems, Inc., the assignee of the present invention.

This invention has discovered that the selective control of process parameters affecting mechanical properties during the build process can be used to achieve parts with desired thermal resistance and durability in discrete regions of the part.

The first step involved in building a part that has discrete regions is to determine what variability in mechanical properties might be achieved from a given stereolithography system/resin combination. Examples are given below for the aforementioned SL 5530 material.

It was discovered through a battery of mechanical tests that the heat deflection temperature of parts made with SL 5530 material can be increased substantially by applying an intermediate optimized level of laser exposure for heat deflection to the material. The table below shows the exposure used to produce a test bar in SL 5530 using an SLA 7000 system. The resultant heat deflection temperature under load (HDT) was measured in accordance with ASTM D648.

TABLE 1

|  | Build Style 1 | Build Style 2 | Build Style 3 | Build Style 4 | Build Style 5 |
|---|---|---|---|---|---|
| Exposure Hatch 1 | 22.3 Mj/cm$^2$ | 22.3 mJ/cm$^2$ | 22.3 mJ/cm$^2$ | 22.3 mJ/cm$^2$ | 22.3 mJ/cm$^2$ |
| Exposure Hatch 2 | 38.5 mJ/cm$^2$ | 46.2 mJ/cm$^2$ | 55.4 mJ/cm$^2$ | 66.5 mJ/cm$^2$ | 55.4 mJ/cm$^2$ |
| Exposure Hatch 3 | 0 mJ/cm$^2$ | 0 mJ/cm$^2$ | 0 mJ/cm$^2$ | 0 mJ/cm$^2$ | 55.4 mJ/cm$^2$ |
| Exposure Hatch 4 | 0 mJ/cm$^2$ | 0 mJ/cm$^2$ | 0 mJ/cm$^2$ | 0 mJ/cm$^2$ | 55.4 mJ/cm$^2$ |

TABLE 1-continued

| | Build Style 1 | Build Style 2 | Build Style 3 | Build Style 4 | Build Style 5 |
|---|---|---|---|---|---|
| Total Exposure/0.008" Layer | 60.8 mJ/cm$^2$ | 68.5 mJ/cm$^2$ | 77.7 mJ/cm$^2$ | 88.8 mJ/cm$^2$ | 188.6 mJ/cm$^2$ |
| HDT (@66 PSI) | 150 C. | 167 C. | 226 C. | 230 C. | 173 C. |

However, the method of manufacture that results in the highest possible HDT is not always the best method for producing models. In this case the method involves under-curing the material in the part being built below its recommended values as exemplified by build style 5 in Table I above. This will result in parts that require special handling as the material will be soft following production and will increase in hardness over time. In addition, it is not advisable to produce an entire model using this method, but only the region that requires additional thermal resistance.

FIG. 2 shows how layer-wise modification of properties can be achieved. A part can be produced that has the high temperature property only where required (the core section of an injection molding tool insert), while the remainder of the part is built in the standard method that assures a firm and easy to handle part. In the case of a part of this type simple changes are made to the build style at an appropriate Z-height during the build. In this case build style 5 would be used for the base of the part, while build style 4 is used to build the top section which requires high temperature performance, as is needed for the core section of an injection molding insert, for example. In this case build style 4 is selected to provide the maximum thermal resistance in a specific region, represented generally by the numeral 33 in FIG. 2 as layers 11–19. In contrast, build style 5 is selected to produce the firmest pattern in the remaining areas represented as layers 1–10, which serve as a stable base for the part. Build style 5 maximizes firmness in the exposed resin by providing a high level of cure relative to the other build styles. This method can be summarized as follows:

1. An .STL file is loaded into 3D Lightyear or Maestro software, or another software package, which allows assignment of build styles to individual .STL file or other appropriate files.

2. Build style 5 is assigned to the .STL file for the Z-range or section that does not require high thermal resistance, but benefits from a style that provides for a robust build.

3. Build style 4 is assigned to the .STL file for the Z-range or section that requires high thermal resistance.

4. The parts are sliced and a build file (such as a .BFF file) is prepared.

5. The resultant build file is built on a stereolithographic machine, such as an SLA® 5000 or 7000 system, or other 3-dimensional photocuring apparatus and the resultant model is collected, cleaned and postprocessed.

6. In order for SL 5530 resin to develop the high temperature characteristics, the part must be heated in an oven at 160° C. for two hours. After this time, the layers in region 33 that were formed using the special build style 4 will have a high thermal resistance, while those layers that were formed using build style 5 will have a dramatically lower thermal resistance.

FIG. 3 shows how modification of mechanical properties within a given layer can be achieved. Using the case outlined above with SL 5530 resin, a part can be produced that has the high temperature property only where desired within a portion of a given layer as well. Here the region that requires high thermal resistance might be a feature that protrudes from the body of a model. To do this, the following steps are undertaken:

1. An .STL file of a model that must be built with selective mechanical properties is imported into a CAD package, such as IronCAD by Visionary Design Systems that will accept .STL files. Alternatively the process can start with a CAD file or other suitable CAD representation.

2. The .STL file is split into sections. Each area of the model that requires a specific property is separated out into is own unique .STL file and saved. If starting from a CAD file, the file can be sectioned and multiple .STL files can be exported such that each section is represented by a corresponding .STL file.

3. The component .STL files that make up the complete model are loaded into 3D Lightyear or Maestro software, or another software package, which allows assignment of build styles to individual .STL files. The components are arranged adjacent to one another such that they are assembled into a whole.

4. Build style 4 is assigned to the component sections or portions of layers 11–19 indicated generally by the numeral 35 in FIG. 3 that require high thermal resistance, and build style 5 is assigned to the remaining component sections or portions of layers 11–19 and all of layers 1–10 and 20–28 to provide for durability in a robust build.

5. The parts are sliced and a build file (such as a .BFF file) is prepared.

6. The resultant build file is built on a stereolithographic machine, such as an SLA® 5000 or 7000 system, or other 3-dimensional photocuring apparatus and the resultant model is collected, cleaned and postprocessed.

7. In order for SL 5530 resin to develop the high temperature characteristics the part must be heated in an oven at 160° C. for two hours. After this time, the portions of layers 11–19 in region 35 that were formed using the special build style 4 will have a high thermal resistance, while those layers and portions that were formed using build style 5 will have a dramatically lower thermal resistance.

FIG. 2 represents a tool that only requires high temperature resistance on the portion against which molten plastic will be molded. In this figure only the upper region 33 of the part requires this heat resistance. Since it is separated from the remaining portion of the part in the Z-direction, a change in build styles at the appropriate Z-height can be used to produce a firm base for the bottom Z-section and a heat resistant molding face at for the upper section.

FIG. 3 also represents a tool that only requires high temperature resistance on the portion against which molten plastic will be molded. In contrast, in this figure only the region 35 to the right of the part requires this heat resistance.

Since it is not separated from the remaining portion and must be drawn on the same layer, a different strategy must be used. In this case the file must be split into two files, one containing the area or region 35 that requires high heat resistance, and one that does not. Then two different build styles are be assigned to each file separately to produce a firm base for the left side of the tool, and a heat resistant molding face for the right side of the tool.

In some photocurable materials the selective control of mechanical properties can also be utilized to achieve changes in durability. This is accomplished in the following fashion.

Again, the first step involved in building a part that has discrete regions is to determine what variability in mechanical properties might be achievable from a given material/machine combination. Examples are given below for the material SL 7510, also available commercially from Ciba Specialty Chemicals, Inc. of Los Angeles, Calif.

It was discovered through a battery of mechanical tests that durability of SL 7510 parts could be increased substantially by changing the manner in which the laser exposure is applied to the material. Table II below shows the particular exposure regimes that have been used to produce different levels of durability within a SL 7510 sample part. These tests are focused on being able to enhance durability within a sample. In this case durability is a qualitative term that can be numerically correlated with two well understood mechanical properties: Tensile Elongation at Break, and Impact Strength. Tensile Elongation is a measure of how far a sample can be stretched prior to breakage. Impact strength is a measure of the concussive force required to break a sample. The data for build styles 1, 2, and 3 were obtained using a SLA 7000 system, a SLA 3500 system, and a SLA 5000 system, respectively. All test results were measured in accordance with the procedures of ASTM D638 and ASTM D256, respectively.

TABLE II

| | Build Style 1 | Build Style 2 | Build Style 3 |
|---|---|---|---|
| Laser Power | 800 mW | 100 mW | 250 mW |
| Hatch Exposure | 98.8 mJ/cm$^2$ | 130.3 mJ/cm$^2$ | 93.4 mJ/cm$^2$ |
| Hatch Spacing | 0.012 inches | 0.004 inches | 0.004 inches |
| Laser Spot Size (hatching) | 0.030 inches | 0.010 inches | 0.010 inches |
| Laser Repetition Rate | 35 KHz | 22.2 KHz | 40 KHz |
| Tensile Elongation (%) | 4% | 10% | 14% |
| Impact Strength | 27 J/m | 37 J/m | 32 J/m |

There are times where are times where it is desirable to have one section of a model be durable, while another area is not. However, the method of manufacture that results in the highest possible durability is not always the best method for producing models or parts. In this case, as exemplified by build styles 2 and 3, the method involves using slow exposure routines that result in longer times to create a model. Build style 1 in Table II uses higher laser power, a larger laser spot size and a wider hatch spacing to achieve faster build times. Build styles 2 and 3 use lower laser powers with a smaller laser spot size, and with tighter hatch spacing. Thus this results in longer build times. The laser spot size in build styles 2 and 3 is one third smaller than the laser spot size in build style 1. Because of this, it is not always advisable to produce an entire model or part using the increased durability method. Rather it is advisable to only apply these styles to the regions that require additional durability. In addition, special applications may be developed by having materials with system laser-tailorable durability and discrete mechanical properties.

Figure 4:
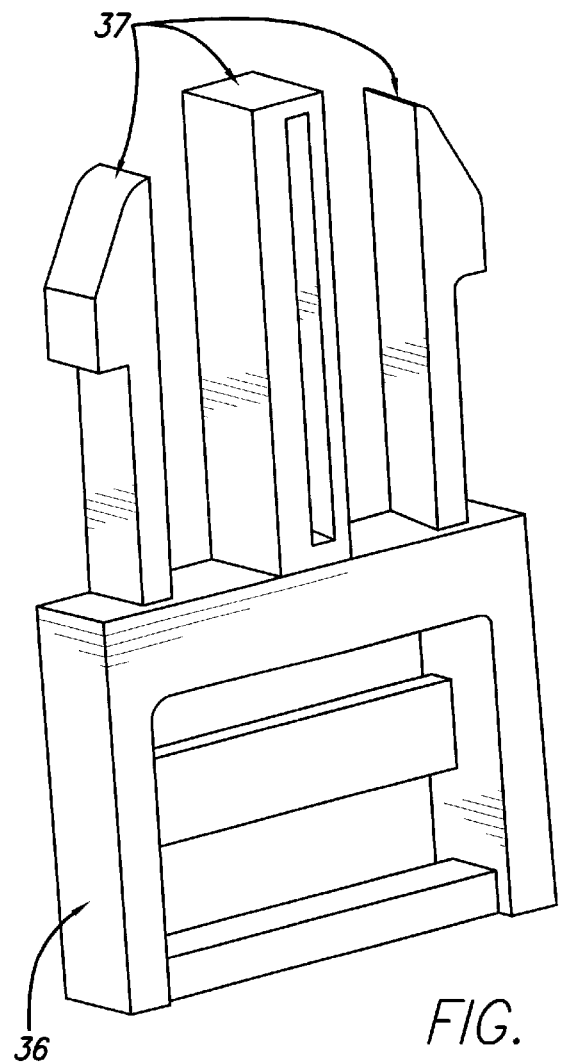
FIG. 4 is an illustration of a part with a snap-fit feature in a selected vertical portion of the part that requires increased durability.
Figure 6:
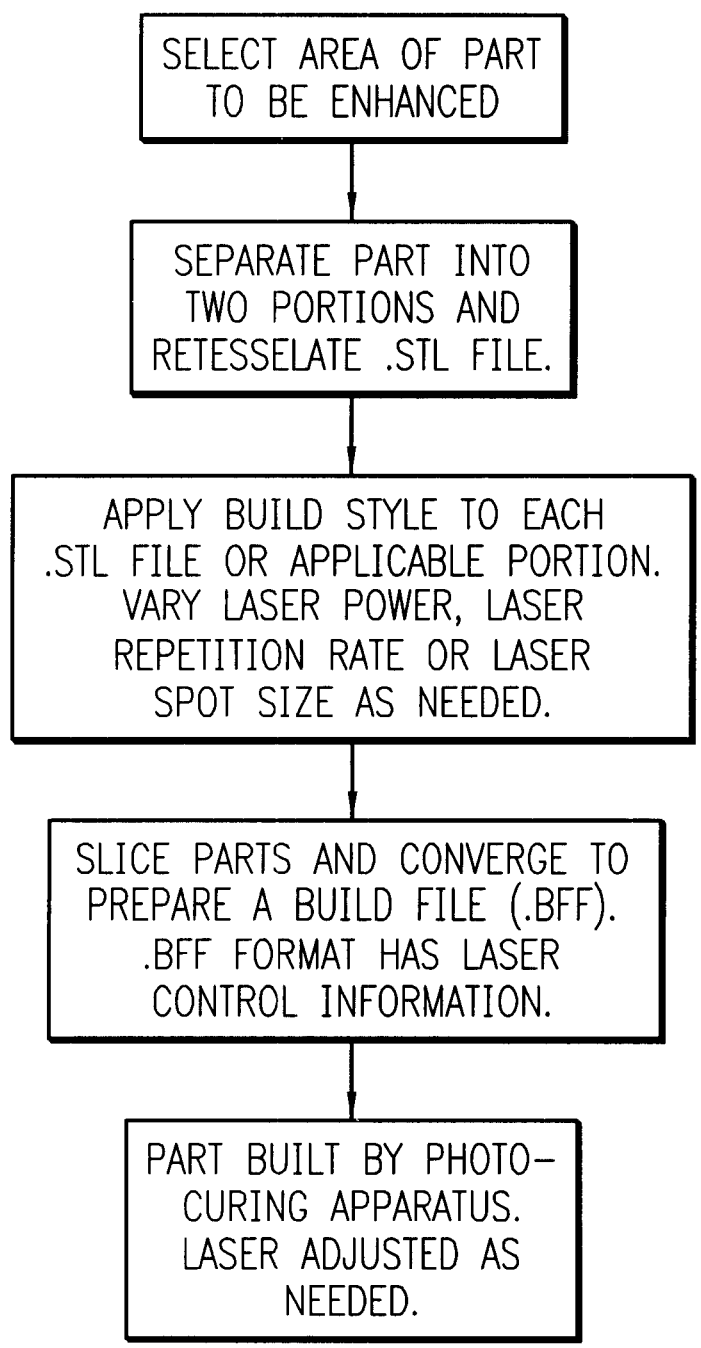
FIG. 6 is an overall flow chart of a software implementation to enable the invention to be practiced automatically in a stereolithographic system by a computer and creating the stereolithographic part using the graphic data supplied by from a CAD program.

FIG. 4 shows how layer-wise modification of durability properties can be achieved. A part can be produced that has the increased durability only where required, for example, a tab for a snap-fit feature while the remainder of the part is built in the standard method that assures a part is produced in the minimum time. In the case of a part of this type, simple changes are made to the build style at an appropriate Z-height during the build. In this case build style 1 is used for the base, indicated generally by the numeral 35, of the part, while build style 2 or 3 is used to build the top section, indicated generally by the numeral 37, which requires the increased durability for the tab. In this case, build style 1 is selected to provide the maximum rate of model production, whereas build style 2 or 3 is selected to produce higher durability. Changing between build styles, however, is not trivial. The stereolithographic machine must be stopped and the laser reconfigured to have the desired spot size, power, and repetition rate. This can currently be done manually, but can be automated using software, as illustrated in the flow-chart in FIG. 6. This method can be summarized as follows:

1. An .STL file is loaded into 3D Lightyear or Maestro software, or another software package, which allows assignment of build styles to individual .STL files.

2. Build style 1 is assigned to the .STL file for the Z-range or section that does not require high durability, but benefits from a style that builds more rapidly.

3. Build style 2 or 3 is assigned to the .STL file for the Z-range or section that requires high durability.

4. The parts are sliced and a build file (such as a .BFF file) is prepared.

5. The resultant build file (.BFF file) is loaded into the control software (such as Buildstation 5.0) of a stereolithographic machine, such as an SLA® 7000 system.

6. The laser is configured as is appropriate for build style 1.

7. The stereolithographic machine's control software is set to build a specific Z-range of the build file.

8. The build file is started on the stereolithography apparatus.

9. After the prescribed Z-range for base 36 is built using build style 1, the machine stops automatically and the laser is reconfigured as is appropriate for build style 2 or 3, as was used in the build file in step 4.

10. The stereolithographic machine's control software is set to build a z-range of the build file corresponding to the remainder or top section 37 of the part that is to be the durable section.

11. The build is started again.

12. The resultant model build is completed.

13. The model can the be collected, cleaned and postprocessed as is desired.

FIG. 4 shows a part where durability is required only in a specific Z-region 37. In this case the upper snapfit features must be durable, while the lower section does not have this requirement. Because the regions that require durability exist on completely different layers than those that do not, the laser need only be controlled on an intra-layer basis.

Figure 5:
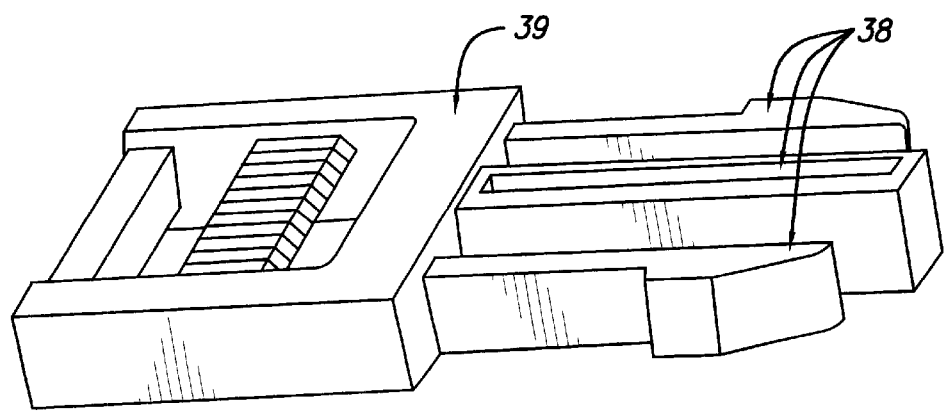
FIG. 5 is an illustration of a part with a snap-fit feature in a selected lateral portion of the part that requires increased durability.

Modification of the mechanical property of durability within a given layer can also be achieved, as seen in FIG. 5. Using the case outlined above with SL 7510 resin, a part could be produced that has the high durability in discrete locations within a given layer as well. In order for this to function properly the build styles that are assigned in the file preparation software (i.e. Lightyear or other software) must carry with it commands that address the laser of the stereolithographic machine or exposure source in another 3-dimensional photocuring apparatus. The changes in style files are used to make changes in the laser. An example of how this is achieved is discussed below. Here the region that requires the high durability is a feature that protrudes from the body of a model, again one with a snap-fit tab. To do this, the following steps are undertaken:

1. An .STL file of a model or part that must be built with selective mechanical properties is imported into a CAD package such as IronCAD by Visionary Design Systems that will accept .STL files. Alternatively the process can start with a CAD file.

2. The .STL file is split into sections. Each area of the model that requires a specific property is separated out into its own unique .STL file and saved. If starting from a CAD file, the file will be sectioned and multiple .STL files will be exported such that each section is represented by a corresponding .STL file.

3. The component .STL files that make up the complete model are loaded into 3D Lightyear or Maestro software, or another software package, which allows assignment of build styles to individual .STL files. The components are arranged adjacent to one another such that they are assembled into a whole.

4. Build style 2 or 3 is assigned to the component sections, indicated generally by the numeral 38, that require high durability, and build style 1 is assigned to the remaining component sections, indicated generally by the numeral 39, to provide for a robust build. In this case each build style also conveys instructions to adjust the laser such that its spot size, power, and pulse frequency correspond to those outlined above.

5. The parts are sliced and a build file such as a .BFF file, is prepared. This build file can not be the traditional .BFF file format, as this format must convey with it information about the laser settings used for each region of the part and the Buildstation or equivalent software must recognize these commands.

6. The resultant build file is built on an SLA® 7000 system, or other appropriate 3-dimensional photocuring system, and the resultant model is collected, cleaned and postprocessed.

FIG. 5 shows a part where durability is required in a specific region 38 within a given layer (i.e. in the XY-plane). In this case the snap-fit features on the right must be durable, while the section 39 on the left does not have this requirement. Since both regions exist within a given layer, the laser must be controlled on an inter-layer basis.

While the invention has been described above with references to specific embodiments thereof, it is apparent that many changes, modifications and variations in the materials, arrangements of parts and steps can be made without departing from the inventive concept disclosed herein. For example, in employing the method of the present invention to form a part, software can be employed that will allow build styles to be assigned to specific triangles of an .STL file or CAD representation so the file need not be split into individual components. While the mechanism is not completely understood, it is theorized that changing physical properties by other than radiation exposure application and processing steps may be effective to obtain different mechanical properties in the finished 3-dimensional parts. The physical properties that can be changed include thermal resistance, durability, color, crystallinity and variable layer thickness. The processing steps that may be changed include thermal post treatment, post curing, and varying the exposure by using different wavelengths of the exposure source. Accordingly, the spirit and broad scope of the appended claims are intended to embrace all such changes, modifications and variations that may occur to one of skill in the art upon a reading of the disclosure. All patent applications, patents and other publications cited herein are incorporated by reference in their entirety.

Having thus described the invention, what is claimed is:

1. A method of forming a three-dimensional object using a photocuring process to stimulate a liquid photocurable medium to selectively change to a cured solid to form the three-dimensional object comprising:

(a) retaining in a container a liquid photocurable medium capable of transformation to a cured solid state upon the selective application of energy to stimulate a change of state;

(b) receiving a data description of an object to be formed;

(c) manipulating the received data to optimize the data for use in selectively applying energy to stimulate the change of state of the liquid photocurable medium to form an object; and (d) selectively applying the energy to the liquid photocurable medium in the container to form the three-dimensional object layer by layer, a formed layer of the object being recoated with the liquid photocurable medium prior to the selective application of energy to transform the layer to the cured solid state, the object selectively having different energy application methods applied to it in different regions to thereby create at least one selected region with different solidification in the transformed pilotocurable medium than an adjacent region to create different mechanical properties in discrete regions of the object, the mechanical properties being selected from the group consisting of heat deflection temperature under load, impact strength, and tensile elongation.

2. The method according to claim 1 further comprising using a radiation source to selectively apply energy to the photocurable medium.

3. The method according to claim 2 further comprising controlling the level of radiation applied by using a lower level of radiation power in at least one region of the object versus a second region.

4. The method according to claim 2 further comprising controlling the level of radiation applied to increase or decrease hatch overcure in a selected region.

5. The method according to claim 2 further comprising controlling the level of radiation applied to obtain thinner hatch layers.

6. The method according to claim 2 further comprising controlling the level of radiation applied by increasing or decreasing the level energy applied to the photocurable medium in a first region versus a second region.

7. The method according to claim 2 further comprising controlling the exposure by using a smaller exposure spot size in at least one selected region versus a second region.

8. The method according to claim 7 further comprising using a photopolymer resin as the photocurable medium.

9. The method according to claim 8 further comprising using a photopolymer resin that is useful in solid ground curing, UV ink jet solid object formation or stereolithography to form a solid 3-dimensional object.

10. The method accordingly to claim 2 further comprising using an exposure spot size that is about one third smaller to control the level of radiation applied.

11. The method according to claim 2 further comprising controlling the level of radiation applied by using wider hatch spacing.

12. The method according to claim 1 further comprising controlling the energy applied to the photocurable medium in selected regions by controlling the level of radiation applied.

13. The method according to claim 1 wherein the step of selectively applying energy to the photocurable medium is automatically performed by a software file.

14. A method of forming a three-dimensional object using stereolithography to stimulate a liquid medium to selectively change state to a solid to form the three-dimensional object comprising:

(a) retaining in a container a liquid state medium capable of transformation to a solid state upon the selective application of energy to stimulate a change of state;

(b) receiving a data description of an object to be formed;

(c) manipulating the received data to optimize the data for use in selectively applying energy to stimulate the change of state of the liquid medium to form an object; and (d) selectively applying the energy to the liquid medium in the container to form the three-dimensional object layer by layer, a formed layer of the object being recoated with the liquid medium prior to the selective application of energy to transform the layer to the solid state, the object selectively having different energy levels applied to it in different regions to thereby create at least one selected region with less solidification in the solid state transformed liquid medium than an adjacent region to create different mechanical properties in discrete regions of the object, the mechanical properties being selected from the group consisting of heat deflection temperature under load, impact strength, and tensile elongation.

15. The method according to claim 14 further comprising using a laser to selectively apply energy to the liquid medium.

16. The method according to claim 15 further comprising controlling the laser beam exposure to increase or decrease the hatch overcure in a selected region.

17. The method according to claim 15 further comprising controlling the laser beam exposure to obtain thinner hatch layers.

18. The method according to claim 15 further comprising controlling the laser beam exposure by increasing or decreasing the repetition firing rate of the laser applying energy to the liquid medium in a first region versus a second region.

19. The method according to claim 15 further comprising controlling the laser beam exposure by using a smaller laser spot size in at least one selected region versus a second region.

20. The method accordingly to claim 19 further comprising using a laser spot size that is about one third smaller to control the laser beam exposure.

21. The method according to claim 15 further comprising controlling the laser beam exposure by using wider hatch spacing.

22. The method according to claim 15 further comprising using a photopolymer resin as the liquid medium.

23. The method according to claim 14 further comprising controlling the energy applied to the liquid medium in selected regions by controlling the laser beam exposure.

24. The method according to claim 14 further comprising controlling the laser beam exposure by using a lower laser power in at least one selected region versus a second region.

25. The method according to claim 14 wherein the step of selectively applying energy to the liquid medium is automatically performed by a software file.

* * * * *

UNITED STATES PATENT AND TRADEMARK OFFICE
CERTIFICATE OF CORRECTION

PATENT NO. : 6,574,523 B1
DATED : June 3, 2003
INVENTOR(S) : Stephen D. Hanna and Khalil M. Moussa Page 1 of 1

It is certified that error appears in the above-identified patent and that said Letters Patent is hereby corrected as shown below:

Column 6,
Line 33, "available conmercially from" should read -- available commercially from --.

Column 9,
Line 50, "There are time where are times where" should read -- There are time where --.

Column 12,
Line 33, "transformed pilotocurable medium" should read -- transformed photocurable medium --.

Signed and Sealed this

Seventeenth Day of August, 2004

JON W. DUDAS
*Acting Director of the United States Patent and Trademark Office*